(No Model.)

J. Y. BASSELL.

SASH FASTENER.

No. 323,020.

2 Sheets—Sheet 1.

Patented July 28, 1885.

WITNESSES
Chas. R. Burr
Fred F. Clunch

INVENTOR
John Y. Bassell
by Clunch & Clunch
His Attorneys (No Model.) 2 Sheets—Sheet 2.
J. Y. BASSELL.
SASH FASTENER.
No. 323,020. Patented July 28, 1885.
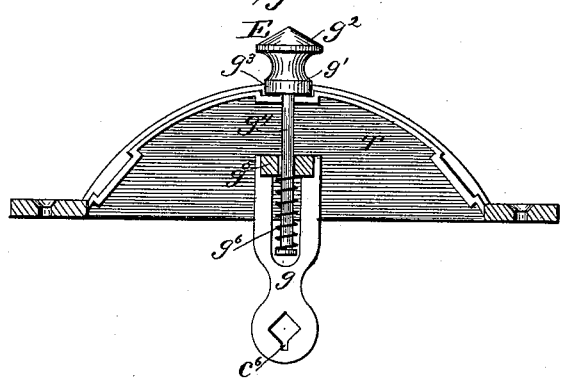
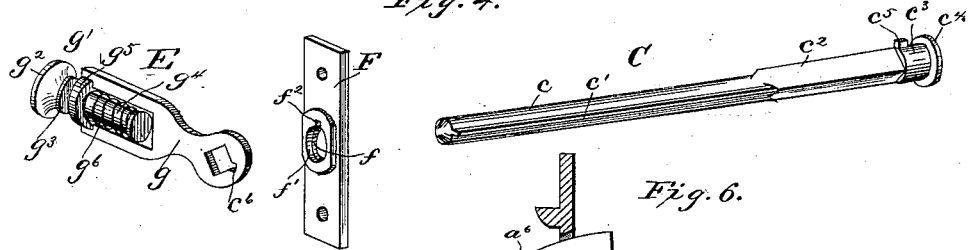
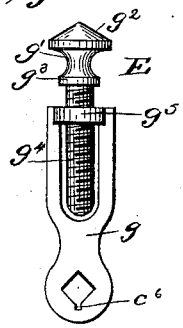
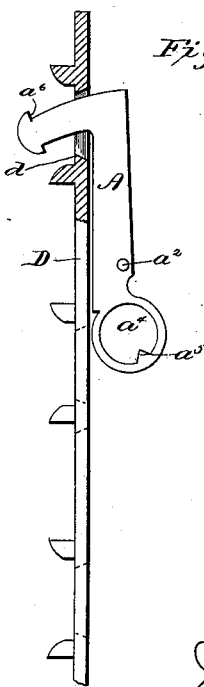
WITNESSES
Chas R Burr
Fred F Church
INVENTOR
John Y. Bassell
by Church & Church
His Attorneys

UNITED STATES PATENT OFFICE.

JOHN Y. BASSELL, OF CINCINNATI, OHIO, ASSIGNOR TO REBECCA G. BASSELL, OF SAME PLACE.

SASH-FASTENER.

SPECIFICATION forming part of Letters Patent No. 323,020, dated July 28, 1885.

Application filed August 4, 1884. (No model.)

*To all whom it may concern:*

Be it known that I, JOHN Y. BASSELL, of Cincinnati, in the county of Hamilton and State of Ohio, have invented certain new and useful Improvements in Sash-Fasteners; and I do hereby declare the following to be a full, clear, and exact description of the same, reference being had to the accompanying drawings, forming part of this specification, and to the figures and letters of reference marked thereon.

My present invention relates more especially to that class of sash-fasteners wherein a spring-projected pivoted dog is employed for engaging the sash, said dog being mounted in housings inserted in the window-frame and actuated to withdraw the dog, and thus release the sash by a transverse key-shaft or spindle; and it consists in the several novel constructions and arrangements of the operating parts, all as hereinafter described, and pointed out in the claims.

Figure 2:
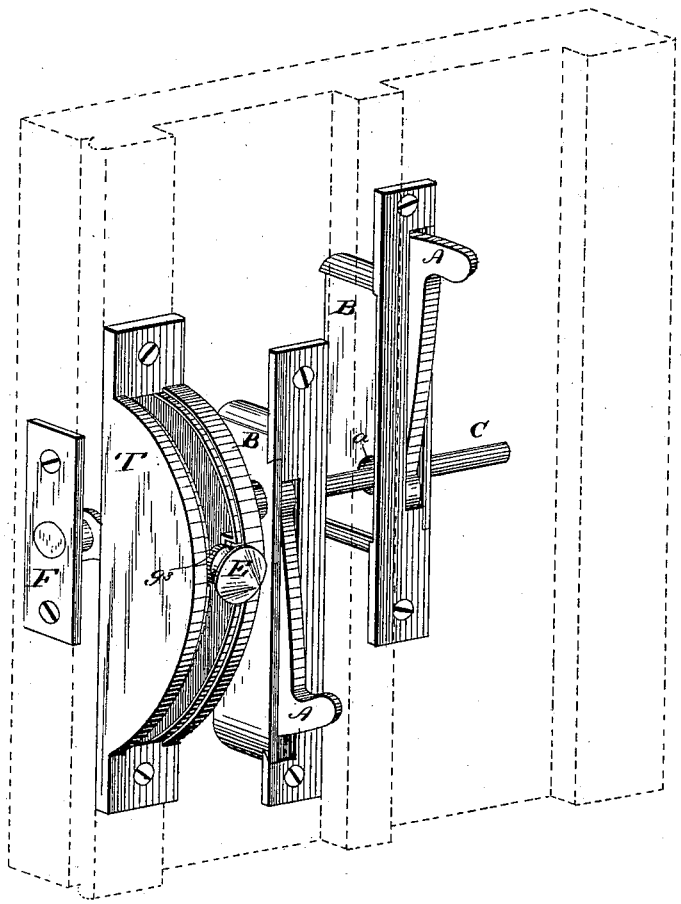
Figure 1:
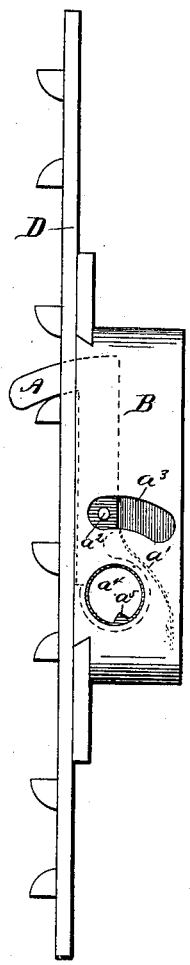

In the accompanying drawings, Figure 1 is a side view of the locking mechanism and strike-plate as arranged for weighted or balanced window-sashes. Fig. 2 is a perspective view of two such locking devices and the actuating mechanism therefor as applied to a window-frame, the latter being shown in dotted lines. Fig. 3 is a longitudinal section of the actuating-lever and locking device. Fig. 4 is a perspective view of the spindle, escutcheon or bearing, and actuating-lever detached. Fig. 5 illustrates a modification of the locking device for the actuating-lever. Fig. 6 is a side view of my improved dog and strike-plate as applied to windows without weights.

Similar letters of reference in the several figures denote the same parts.

The dog A is provided with a cylindrical boss or hub, $a$, fitting an opening in the housing B, constituting the pivot upon which the dog oscillates. A spring, $a'$, serves to hold the dog outward toward the sash, and a supplemental bearing-pin, $a^2$, is formed on or attached to the side of the dog opposite that on which the boss $a$ is formed, and projects into an arc-shaped opening or recess, $a^3$, in the wall of the housing. Through the end of the dog and the center of the boss is formed an opening, $a^4$, for the reception of the spindle C, and in said opening is arranged an offset or abutment, $a^5$, for the engagement of a feather or projection, $c$, on the spindle C, whereby, when the spindle is rotated in one direction, one dog will be withdrawn, and when rotated in the opposite direction the other dog will be retracted.

The construction and arrangement of the several parts above described are the same as those disclosed in my prior application filed November 24, 1883, and numbered 112,698, and are not herein claimed.

Instead of forming the projecting and locking portion $a^5$ of the dog at right angles, as heretofore, I construct it with its upper and lower bearing-faces in the arc of a circle whose center is the pivotal point of the dog. The object of this arrangement is to do away with certain defects in the operation of pivoted locking-dogs, as heretofore constructed. When the bearing-surface of the dog is tangentially or eccentrically arranged with respect to the radius-bar and its pivot, the projecting portion of the dog cannot be at once inserted into the recess in the sash and hold the latter firmly in its adjusted position, for the reason that the extreme end of the dog moves in the arc of a circle somewhat larger than that traversed by the bearing-point or that upon which the sash rests; hence the latter must be elevated above the locking-point to admit the end of the dog and then dropped to the resting-point, and the sash must in like manner be manipulated to permit the withdrawal of the dog and the release of the sash.

By constructing the projecting and engaging portion of the dog on the arc of a circle it will readily enter and sustain the sash at any point desired, and can be withdrawn without raising the sash, while at the same time the weight or thrust of the sash will be borne by the radius-bar and nearly in line with the pivot.

When the windows are weighted or balanced, the simple arc-shaped dogs are employed; but with unweighted windows it is advantageous to form a notch, $a^6$, near the outer end of the projecting portion of the dog, and to provide a shoulder or offset, $d$, on the strike-plate D. The object of thus providing the dog with a notch and the strike-plate with a shoulder is to prevent the accidental or intentional withdrawal of the dog without first sustaining or supporting the sash, whereby the accidental dropping of the sash which might otherwise occur is guarded against. This detent is especially necessary where the arc-shaped dog is employed in connection with unweighted window-sashes, for, as the dog can be readily withdrawn, if the sash were not supported it would suddenly drop, and the detent operates as a reminder to the person that the sash must be supported.

As the notches are below the general curved surface of the dogs, they will not interfere with the free action of the dogs if applied to weighted sashes; but they are designed more particularly for use with unweighted sashes to obviate the difficulty named.

Where the spindle C for actuating the dogs is extended through the reveal of the window-frame and the lever or head applied thereto, it interferes with the use of inner blinds and necessitates a removal of part of the blind to accommodate the head.

To avoid the mutilation of the blind and at the same time secure a convenient position for the actuating-lever E, I have formed a slot in the inside stop-piece, W, through which projects the actuating-lever E. The spindle C upon which the lever E is mounted is formed with a cylindrical or reduced portion, $c$, having a feather or projection, $c'$, for engagement with the abutment $a^5$ in the eye of the dogs, a square or angular portion, $c^2$, for the reception of the end of the lever E, and a cylindrical head, $c^3$, provided with a flange or collar, $c^4$, and a stud, $c^5$. The opening in the end of the lever E is made to conform to the angular portion $c^2$ of the spindle, and is preferably provided with a notch, $c^6$, through which the feather $c'$ passes when inserting the spindle; but if deemed expedient the square portion may be dispensed with and the feather extended to the cylindrical head $c^3$, whereby the spindle is adapted for use on wider or narrower frames.

For the purpose of holding the spindle in place and to secure a neat finish I apply an escutcheon, F, on the inner face of the reveal. This escutcheon is provided with a countersunk recess, $f$, for the reception of the flanged head of the spindle, and a circular opening, $f'$, forming a bearing for the cylindrical head $c^3$. A notch, $f^2$, is formed in the escutcheon for the passage of the stud $c^5$.

The manner of applying my locks to the frames is as follows: Mortises for the reception of the housings having been cut in the frame and a transverse auger-hole for the spindle, the locks are fastened in position. The spindle is passed through the escutcheon and turned part way around, so that the stud $c^5$ will bear against the inner side of the escutcheon and prevent their separation. The lever E having been passed through the mortise in the inner stop and brought into line with the eyes in the pivoted dogs, the spindle is passed through and the escutcheon secured in a mortise made in the inner face of the reveal. As thus arranged and applied the escutcheon performs the double office of a bearing and a lock for the spindle, and at the same time forms a neat and ornamental finish and cover for the hole made in the reveal.

When the spindle is turned in either direction by the manipulation of the lever E, it causes the withdrawal of one of the locking-dogs and the release of one sash, and when no force is applied to the lever both dogs are projected.

In order to prevent the lever from being manipulated from the outside, as when the sash is locked at the point of ventilation, and at the same time provide a means whereby either dog can be held out of engagement, as is frequently desirable while washing the glass, &c., I have constructed the lever in two parts, $g$ $g'$, the inner portion, $g$, being attached to the spindle, and the outer portion, $g'$, sliding upon the former, and adapted to enter recesses formed in the curved outer face of a slotted casing or escutcheon, T, attached to the face of the inner stop.

The outer portion, $g'$, of the lever E is provided with a thumb-piece or head, $g^2$, lateral wings or projections $g^3$ to engage the notches or projections formed in the escutcheon T, and a shank, $g^4$, which passes through a collar, $g^5$, on the part $g$. A spring, $g^6$, arranged between the end of the shank $g^4$ and the collar $g^5$, serves to draw the outer portion inward and maintain the wings or projections $g^3$ in contact with the escutcheon T, and when it is desired to manipulate the lever E to operate or release either dog it is only necessary to first raise the part $g'$, and then turn it in the desired direction.

In lieu of the spring and sliding section, I may construct the lever as shown in Fig. 5, wherein one part is screw-threaded into the other. In this case, instead of pulling the section $g'$ out and thus releasing it from the escutcheon T, it is only necessary to turn or rotate the outer section until its collar clears the recess or projection with which it is designed to engage.

As will be seen from an inspection of Fig. 2, the housings B are inserted in mortises cut next the parting-strip of the window-frame and the locking-dogs are hung to one side of the housing, the face-plate of the latter being wider on the side next the parting-strip. This arrangement is adopted for two reasons. In the first place it secures the proper location of the dogs with reference to each other and the window-sashes, and in the second place it renders the locks for the upper and lower sashes interchangeable. The relative position of the locks being first ascertained by the method described in my aforesaid application of November 24, 1883, any of the locks may be applied indifferently to the upper or lower sash, as, in reversing, the wider side is brought next the parting strip, thus determining the proper position for the dog with respect to the sash and the strike-plate attached thereto. This strike-plate D is applied to the sash at one side the central line thereof, and toward the parting-strip, in order to avoid interference with the balance-cord, and to afford a locking-point near the end of the sash, which latter could not well be accomplished if the dogs were centrally located.

The projections on the inner face of the strike-plate D perform important functions, serving not only to increase the bearing for the dog as well as for the plate itself, but also as a means for indicating where the mortises are to be cut to accommodate the dogs and projections themselves.

The strike-plate is laid upon or against the sash and the outline drawn. It is then turned over and struck lightly with a hammer or other tool, causing the points to indent the sash and thus indicate the spaces to be cut out. When the strike-plate is properly seated, the projections interlock with the sash, and the plate is thus held tightly in place independently of the retaining-screws.

When it is attempted to force the sash up or down, the thrust is borne by the dog nearly in line with its pivot, and the strike-plate is prevented from displacement by its interlocking projections bearing against the end of the several mortises.

Having thus described my invention, I claim as new—

1. In a sash-fastener, and in combination with the recessed sash, a locking-dog pivoted to the frame and provided with an interlocking portion, whose bearing-surfaces are formed in arcs of circles, of which the pivot is the center, substantially as described.

2. In a sash-fastener, and in combination with the sliding sash and the recesses therein, a pivoted locking-dog mounted in bearings in the frame, and provided with an arc-shaped engaging portion whereby the dog can be inserted and withdrawn from the recess in the sash without moving the latter, substantially as and for the purpose set forth.

3. In a sash-fastener, and in combination with the window-sash and its attached strike-plate provided with a shoulder or offset, as described, a pivoted locking-dog having the arc-shaped bearing surfaces, and the notches near the outer end thereof, substantially as described.

4. In a sash-fastener, and in combination with the window-sash, the spring-pressed locking-dog having an arc-shaped engaging portion and a pivot concentric therewith, and the operating key or spindle passing through said pivot and engaging a lug or projection therein, substantially as described.

5. In a sash-fastener, and in combination with the locking-dog thereof, the actuating-spindle provided with a flange or collar at one end and an interlocking stud or projection, and an escutcheon having a notched collar or opening for the reception of the end of the spindle to prevent longitudinal movement of the latter and form a bearing therefor, substantially as described.

6. In a sash-fastener, and in combination with the locking-dog thereof and the operating-lever, the angular or feathered actuating-spindle and the escutcheon, the latter adapted to form a bearing for the end of the spindle and prevent its withdrawal, substantially as described.

7. In a sash-fastener, and in combination with the pivoted dogs, the operating-lever, and the escutcheon, the removable actuating-spindle adapted to be inserted through the said operating-lever and escutcheon, and to be locked in position by a collar or flange on the latter, resting between a stud and collar on the end of the said spindle, substantially as described.

8. In a sash-fastener, and in combination with the locking dogs and actuating-spindle, the operating-lever connected at one end to said spindle and provided with a sliding portion or extension for engagement with a locking-plate, substantially as described.

9. In a sash-fastener, and in combination with the actuating-spindle and the locking-dogs controlled thereby, the operating-lever applied to said spindle and provided with a locking device for engagement with a fixed plate or escutcheon, substantially as described.

10. In a sash-fastener, and in combination with the actuating-spindle and the locking-dogs controlled thereby, the operating-lever applied to said spindle and carrying the outer sliding section, provided with wings or projections for engaging suitable recesses or projections in an escutcheon or plate, substantially as described.

JOHN Y. BASSELL.

Witnesses:
  R. P. RIFENBRUCK,
  OLIVER M. LANGDON.